United States Patent [19]

Sterzel et al.

[11] Patent Number: 4,584,359
[45] Date of Patent: Apr. 22, 1986

[54] VINYL POLYMER MEMBRANES

[75] Inventors: Hans-Josef Sterzel, Dannstadt-Schauernheim; Axel Sanner, Frankenthal; Peter Neümann, Wiesloch, all of Fed. Rep. of Germany

[73] Assignee: BASF Aktiengesellschaft, Ludwigshafen, Fed. Rep. of Germany

[21] Appl. No.: 705,793

[22] Filed: Feb. 26, 1985

[30] Foreign Application Priority Data

Feb. 28, 1984 [DE] Fed. Rep. of Germany ....... 3407148

[51] Int. Cl.⁴ .............................................. C08F 30/04
[52] U.S. Cl. ................................. 526/241; 210/500.2; 428/315.5
[58] Field of Search .................. 210/500.2; 428/315.5, 428/315.7, 315.9; 526/241

[56] References Cited

U.S. PATENT DOCUMENTS 4,424,359 1/1984 Kaschig et al. ...................... 526/241
4,483,901 11/1984 Okita et al. ......................... 428/315.5

OTHER PUBLICATIONS

"Energy Technology" (Proc. Energy Technology Conference, Washington), vol. 9, (1982), pp. 504–509.

"Makromolekulare Chemie", Rapid Comm., vol. 1, (1980), pp. 753–758.

Primary Examiner—William J. Van Balen
Attorney, Agent, or Firm—Keil & Weinkauf

[57] ABSTRACT

A membrane of a vinyl polymer which contains groups of the formula

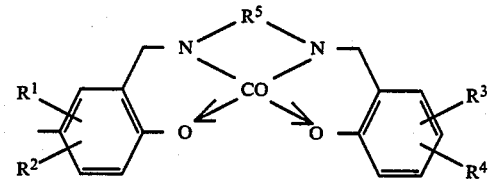

where $R^1$, $R^2$, $R^3$ and $R^4$ are each hydrogen, methyl, methoxy, fluorine or trifluoromethyl and $R^5$ is —CH$_2$—CH$_2$— or

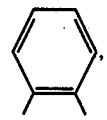

covalently bonded to the polymer chain, and the use of the said membrane.

2 Claims, No Drawings

VINYL POLYMER MEMBRANES

The invention relates to vinyl polymer membranes which contain oxygen-transferring groups, and to the use of the said membranes.

Energy Technology (Proc. Energy Technology Conference, Washington), volume 9 (1982), pages 505 to 509, discloses membranes, for example of silicone rubber, polystyrene or polyethyl methacrylate, which have improved oxygen permeability. This paper also describes that the separation factor for oxygen is improved by incorporation of oxygen transfer agents. Examples of suitable membranes are stated to be liquid membranes which are applied onto a microporous polymer membrane and which contain dissolved oxygen transfer agents. A disadvantage of such membranes is their short life, of only a few months, and their insufficient permeability to oxygen.

Makromolekulare Chemie, Rapid Comm., 1 (1980), 753–758, has also disclosed vinyl polymers which contain Co(salene) groups bonded to the polymer chain. The paper merely mentions that such polymers are capable of bonding oxygen.

It is an object of the present invention to provide membranes which have excellent oxygen permeability, a good separation factor and increased life.

We have found that this object is achieved by providing a membrane of a vinyl polymer comprising units which contain groups of the formula

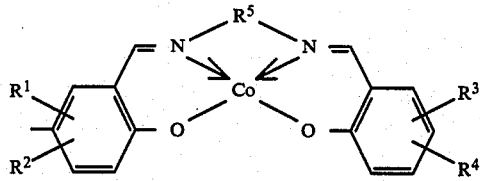

where $R^1$, $R^2$, $R^3$ and $R^4$ are each hydrogen, methyl, methoxy, fluorine or trifluoromethyl and $R^5$ is —CH$_2$—CH$_2$— or

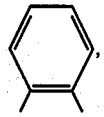

covalently bonded to the polymer chain.

The invention further relates to the use of such membranes for separating molecular oxygen out of gases in which it is present.

It is a distinguishing feature of the novel membranes that they contain oxygen-transferring groups not in solution, but in a chemically bonded form. Moreover, the novel membranes have good oxygen permeability and an increased separation factor. Finally, they have an increased life.

The novel membranes are composed of vinyl polymers in which preferably not less than 10% of the vinyl units contain a group of the formula I

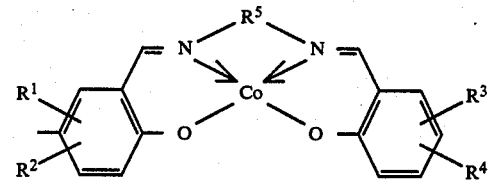

where $R^1$, $R^2$, $R^3$ and $R^4$ are each hydrogen, methyl, methoxy, fluorine or trifluoromethyl and $R^5$ is —CH$_2$—CH$_2$— or

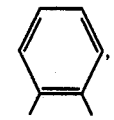

covalently bonded to the polymer chain. Suitable vinyl monomers are all those which form copolymers with one another.

Preferred membranes are composed of
(a) from 10 to 90 mole % of units of the formula

where A is a Co(salene) radical of the formula I, and
(b) from 10 to 90 mole % of units derived from vinylpyridines, with or without
(c) from 0 to 80 mole % of units which are derived from vinyl monomers which are copolymerizable with (a) and (b).

Particularly preferred membranes are composed of from 20 to 70 mole % of (a), from 20 to 70 mole % of (b) and from 0 to 20 mole % of (c). Especially preferred monomers from which the units (a) are derived are those of the formula II, where the substituents $R^1$, $R^2$, $R^3$ and $R^4$ in the Co(salene) group A are hydrogen. Examples of vinylpyridines suitable as component (b) are vinylpyridine, which may be substituted by 1 or 2 methyl or methoxy groups. 2-Vinylpyridine and 4-vinylpyridine are especially preferred. The preferred component (c) is styrene or methylstyrene, especially styrene.

The polymers may be prepared by free radical polymerization using known methods, as described, for example, in Makromolekulare Chemie Rapid Commun., 1 (1980), 753–758.

An advantageous method of preparing membranes from polymers of the above composition is to dissolve the polymer in a suitable polar solvent, eg. tetrahydrofuran, dimethylformamide, N-methylpyrrolidone, pyridine or dimethylsulfone, casting a film from this solution and evaporating the solvent. Advantageously, the films are applied onto microporous membranes known as microfiltration membranes, for example membranes of polyethylene, polypropylene or polytetrafluoroethylene. These carrier membranes can be a sheet-like structure, such as a plate module or spiral module, or can be in the form of hollow fibers and hollow fiber modules. The novel membranes are as a rule from 0.1 to 100 μm thick.

The novel membranes may be used for separating molecular oxygen out of gases in which it is present, especially for separating molecular oxygen out of air, or for enriching air with molecular oxygen, for example for firing of metallurgical furnaces, aeration of sewage installations or aeration of fermentation processes.

The novel membranes may also be used as cathodes in fuel cells which employ air or molecular oxygen as the oxidant. At the cathode, the oxygen from the air takes up electrons and passes into solution as the OH ion. The disadvantage of the prior art air cathodes is that they constitute three-phase systems which are difficult to control. In the rigid, porous cathode material of the prior art air cathodes, the gas pressure on the gas side must accurately correspond to the liquid pressure on the electrolyte side, to prevent air passing into the electrolyte or electrolyte penetrating into the gas space, since both are a serious disadvantage. Very recently, therefore, a start has been made on developing non-porous air cathodes which contain catalysts. With these, current densities of from about 3 to 10 mA/cm$^2$ are achieved regardless of the type of catalyst. However, the current density is restricted by the fact that the oxygen permeability of the polymers is far too low. This disadvantage is overcome by the novel membranes. In combination with a perfluorinated cation exchange membrane as a solid electrolyte, and a suitable film-shaped anode, fuel cells are obtained which consist of membranes only and which accordingly have a very high performance per unit volume or unit weight.

The examples which follow illustrate the invention.

EXAMPLE 1

Preparation of the polymer

2-Hydroxy-5-vinylbenzaldehyde was prepared by the method of Wulff et al. (Makromolekulare Chemie, 179 (1979), 2647) by chloromethylating salicylaldehyde, reacting the 5-chloromethylsalicylaldehyde with triphenylphosphine and converting the phosphonium salt to the above compound.

1. 74 g (1 mole) of butylamine were added to a solution of 74 g (0.5 mole) of 2-hydroxy-5-vinylbenzaldehyde in 750 ml of toluene, and this mixture was refluxed for 2 hours. It was then extracted with twice 500 ml of ice water and the toluene was distilled off. 80 g (79%) of 2-butyliminomethyl-4-vinylphenol were obtained as a yellow oil.

2. 80 g of 2-butyliminomethyl-4-vinylphenol, 42 g of 4-vinylpyridine and 21 g of styrene were dissolved in 1200 ml of ethylbenzene, this mixture was heated to 80° C., 100 mg of 2,2'-azoisobutyronitrile were added and the whole was stirred under nitrogen for 24 hours. The polymer was isolated by precipitation with methanol. It was then redissolved in dimethylformamide and again precipitated in methanol, giving 122 g (85%) of a yellowish polymer.

3. 20 g of the polymer thus obtained were refluxed for 3 hours in a mixture of 400 ml of water, 400 ml of ethanol and 80 ml of sulfuric acid, in order to split off the butylamine acting as a protective group. 16.8 g of a polymer were recovered.

4. 60 g of aldehyde copolymer were refluxed for 24 hours with 20 ml of ethylenediamine in 300 ml of toluene. The polymeric Schiff base was precipitated in methanol, filtered off and dried under reduced pressure. 18.3 g of this base were obtained.

5. 18.0 g of the polymeric Schiff base were dissolved in 300 ml of toluene. 10 g of salicylaldehyde were added and the mixture was refluxed for 24 hours. The yellow polymer which precipitated was extracted with methanol. 19.3 g of polymer were obtained.

6. A mixture of 19 g of the polymer from stage 5 and 14 g of cobalt-(II) acetate.4H$_2$O in 700 ml of oxygen-free dimethylformamide was heated at 80° C. for 24 hours. The coordination polymer thus obtained was extracted with ethanol under nitrogen. The yield was 17.6 g.

Preparation of the membranes 0.5 g of the polymer obtained in stage 6 was dissolved in 50 ml of pyridine, in the absence of molecular oxygen. A microporous polyethylene microfiltration membrane ( ®Celgard K 801 from Celanese), to serve as the carrier, was dipped into this solution. The excess solution was removed and the membrane slowly dried under nitrogen. On taking the membrane out of the protective gas atmosphere, the color changed within ½ minute from brown/yellow to a color ranging from deep red to black, this being an indication of the rapid uptake of oxygen from the air.

The weight increase relative to the untreated carrier membrane showed that about 100 cm$^2$ of the carrier surface were coated with about 120 mg of polymer. This corresponds to a mean coating thickness of about 10 μm.

Use of the membrane for separating out molecular oxygen

The membrane prepared as above was clamped pressure-tight in a test chamber, using a coarse-pored sintered glass disk as the support. Dried, oil-free air at 30°–35° C. was led past the open outer surface. On the opposite side, air was pumped away and the amount and concentration of the oxygen passing through the membrane were measured. For this purpose, the pressure on the suction side must not exceed 60 mbar. After due deduction of the carrier surface (about 40%), the membrane was found to have an oxygen permeability of about $1-4 \times 1-4 \times 10^{-6}$ cm$^3$/cm$^2$.s.cm Hg. The oxygen/nitrogen separation factor was greater than 1,000. The permeability depends on the conditions of preparation and is between $1.10^{-6}$ and $5.10^{-6}$ cm$^3$/cm$^2$.s.cm. Hg.

Similar good results are achieved with membranes made from modified polymer compositions.

We claim:

1. A membrane of a vinyl polymer comprising
   (a) from 10 to 90 mole % of units derived from monomers of the formula II

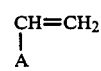

where A is a Co(salene) radical of the formula I

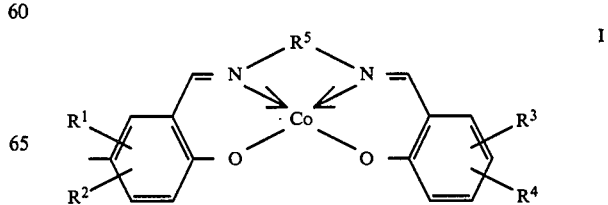

where $R^1$, $R^2$, $R^3$ and $R^4$ are each hydrogen, methyl, methoxy, fluorine or trifluoromethyl and $R^5$ is —$CH_2$—$CH_2$— or 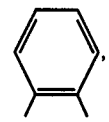

and
(b) from 10 to 90 mole % of units which are derived from vinylpyridines, and
(c) from 0 to 80 mole % of units which are derived from vinyl monomers which are copolymerizable with (a) and (b).

2. A membrane as claimed in claim 1, wherein the vinyl polymer is composed of monomers of the formula II, vinylpyridine and styrene.

* * * * *